United States Patent
Lee et al.

(10) Patent No.: US 10,796,104 B1
(45) Date of Patent: Oct. 6, 2020

(54) SYSTEMS AND METHODS FOR CONSTRUCTING AN ARTIFICIALLY DIVERSE CORPUS OF TRAINING DATA SAMPLES FOR TRAINING A CONTEXTUALLY-BIASED MODEL FOR A MACHINE LEARNING-BASED DIALOGUE SYSTEM

(71) Applicant: Clinc, Inc., Ann Arbor, MI (US)

(72) Inventors: Andrew Lee, Ann Arbor, MI (US); Stefan Larson, Ann Arbor, MI (US); Christopher Clarke, Ann Arbor, MI (US); Kevin Leach, Ann Arbor, MI (US); Jonathan K. Kummerfeld, Ann Arbor, MI (US); Parker Hill, Ann Arbor, MI (US); Johann Hauswald, Ann Arbor, MI (US); Michael A. Laurenzano, Ann Arbor, MI (US); Lingjia Tang, Ann Arbor, MI (US); Jason Mars, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 16/907,792

(22) Filed: Jun. 22, 2020

Related U.S. Application Data

(60) Provisional application No. 62/870,180, filed on Jul. 3, 2019, provisional application No. 62/870,156, filed
(Continued)

(51) Int. Cl.
*G06F 40/35* (2020.01)
*G06F 40/284* (2020.01)
(Continued)

(52) U.S. Cl.
CPC ............ *G06F 40/35* (2020.01); *G06F 40/284* (2020.01); *G06N 5/043* (2013.01); *G06N 20/00* (2019.01)

(58) Field of Classification Search
CPC ..... G10L 15/08; G10L 15/183; G10L 15/187; G10L 15/197; G10L 15/063;
(Continued)

(56) References Cited

U.S. PATENT DOCUMENTS 10,503,834 B2 * 12/2019 Bachrach .............. G06F 40/284
10,706,236 B1 *  7/2020 Platt ....................... G06F 40/30
(Continued)

*Primary Examiner* — Angela A Armstrong
(74) *Attorney, Agent, or Firm* — Padowithz Alce

(57) ABSTRACT

Systems and methods for constructing an artificially diverse corpus of training data includes evaluating a corpus of utterance-based training data samples, identifying a slot replacement candidate; deriving distinct skeleton utterances that include the slot replacement candidate, wherein deriving the distinct skeleton utterances includes replacing slots of each of the plurality of distinct utterance training samples with one of a special token and proper slot classification labels; selecting a subset of the distinct skeleton utterances; converting each of the distinct skeleton utterances of the subset back to distinct utterance training samples while still maintaining the special token at a position of the slot replacement candidate; altering a percentage of the distinct utterance training samples with a distinct randomly-generated slot token value at the position of the slot replacement candidate; and constructing the artificially diverse corpus of training samples based on a collection of the percentage of the distinct utterance training samples.

18 Claims, 4 Drawing Sheets

Related U.S. Application Data on Jul. 3, 2019, provisional application No. 62/890,296, filed on Aug. 22, 2019.

(51) Int. Cl.
*G06N 5/04* (2006.01)
*G06N 20/00* (2019.01)

(58) Field of Classification Search
CPC ..... G10L 15/1822; G10L 15/22; G06F 40/35; G06F 40/284; G06N 20/00; G06N 5/043
See application file for complete search history.

(56) References Cited

U.S. PATENT DOCUMENTS

| | | | |
|---|---|---|---|
| 2002/0128821 A1* | 9/2002 | Ehsani | G06F 40/35 704/10 |
| 2012/0254143 A1* | 10/2012 | Varma | G06F 40/30 707/706 |
| 2015/0066479 A1* | 3/2015 | Pasupalak | G06F 16/9535 704/9 |
| 2019/0129932 A1* | 5/2019 | Sakai | G06N 20/00 |
| 2019/0251165 A1* | 8/2019 | Bachrach | G06F 40/30 |
| 2020/0152184 A1* | 5/2020 | Steedman Henderson | G10L 15/16 |
| 2020/0184155 A1* | 6/2020 | Galitsky | G06F 40/117 |

\* cited by examiner

Identifying Replaceable Slots Of An Utterance S210

Identifying & Extracting Skeleton Utterances S220

Altering Safe Slots Of A Training Sample S230

Training A Contextually-Biased Model S240

FIGURE 2

SYSTEMS AND METHODS FOR CONSTRUCTING AN ARTIFICIALLY DIVERSE CORPUS OF TRAINING DATA SAMPLES FOR TRAINING A CONTEXTUALLY-BIASED MODEL FOR A MACHINE LEARNING-BASED DIALOGUE SYSTEM

CROSS-REFERENCE TO RELATED APPLICATIONS

This application claims the benefit of U.S. Provisional Application No. 62/870,180, filed 3 Jul. 2019, U.S. Provisional Application No. 62/870,156, filed 3 Jul. 2019, U.S. Provisional Application No. 62/890,461, filed 22 Aug. 2019, and U.S. Provisional Application No. 62/890,296, filed 22 Aug. 2019, which are incorporated herein in their entireties by this reference.

GOVERNMENT RIGHTS

The subject matter of the invention may be subject to U.S. Government Rights under National Science Foundation grants: NSF SBIR Phase 1 Grant—1622049 and NSF SBIR Phase 2 Grant—1738441.

TECHNICAL FIELD

The inventions herein relate generally to the machine learning and artificially intelligent dialogue systems fields, and more specifically to a new and useful system and method for intelligently classifying unstructured data into a machine learning-based conversational service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for categorizing user input and generating responses to users may not fully satisfy queries and commands posed by a user for which there are no predetermined rules to provide a meaningful response or result to the user.

Therefore, there is a need in the machine learning field and virtual dialogue service fields for systems and methods that enable intelligent techniques for categorizing unstructured data to structured categories of a machine learning-based dialogue service. The embodiments of the present application described herein provide technical solutions that address, at least, the need described above, as well as the deficiencies of the state of the art described throughout the present application.

SUMMARY OF THE INVENTION(S)

In one embodiment, a method of constructing an artificially diverse corpus of training data samples for training a contextually-biased model for a machine learning-based dialogue system includes evaluating a corpus of utterance-based training data samples, wherein the evaluating includes: identifying a slot replacement candidate relating to a slot existing in one or more utterance training samples of the corpus that is suitable for replacement with a randomly-generated slot token value; deriving one or more distinct skeleton utterances that include the slot replacement candidate based on an input of a plurality of distinct utterance training samples from the corpus, wherein deriving the one or more distinct skeleton utterances includes replacing one or more slots of each of the plurality of distinct utterance training samples with one of a special token and one or more proper slot classification labels; selecting a subset of the one or more distinct skeleton utterances; converting each of the one or more distinct skeleton utterances of the subset back to one or more distinct utterance training samples while still maintaining the special token at a position of the slot replacement candidate; altering a percentage of the one or more distinct utterance training samples by supplanting the special token with a distinct randomly-generated slot token value at the position of the slot replacement candidate; and constructing the artificially diverse corpus of training data samples for training the contextually-biased model based on a collection of the percentage of the one or more distinct utterance training samples.

In one embodiment, identifying the slot replacement candidate includes: selecting a slot of the one or more utterance training samples of the corpus as the slot replacement candidate if an enumerability of the slot to different token values satisfies or exceeds an enumeration threshold, wherein the enumeration threshold comprises a minimum number of possible token values for the given slot.

In one embodiment, identifying the slot replacement candidate includes: categorizing the slot replacement candidate of the one or more utterance training samples of the corpus as one of a safe slot and an unsafe slot, wherein the safe slot relates to a target slot that is suitable for replacement with the randomly-generated token value, and wherein the unsafe slot relates to a distinct target slot that is not suitable for replacement with a distinct randomly-generated token value.

In one embodiment, categorizing the slot replacement candidate of the one or more utterance training samples includes: measuring an average token length for the slot replacement candidate within the corpus; evaluating the average token length of the slot replacement candidate against a token length threshold; if the average token length of the slot replacement candidate satisfies or exceeds the token length threshold, categorizing the slot replacement as a distinct unsafe slot.

In one embodiment, categorizing the slot replacement candidate of the one or more utterance training samples includes: measuring an average token length for the slot replacement candidate within the corpus; evaluating the average token length of the slot replacement candidate against a token length threshold; if the average token length of the slot replacement candidate does not exceed the token length threshold, categorizing the slot replacement as a distinct safe slot.

In one embodiment, categorizing the slot replacement candidate of the one or more utterance training samples includes: measuring an enumerability attribute for the slot replacement candidate within the corpus; evaluating the enumerability attribute of the slot replacement candidate against an enumeration threshold; if the enumerability attribute of the slot replacement candidate satisfies or exceeds the enumeration threshold, categorizing the given slot candidate as a distinct safe slot.

In one embodiment, categorizing the slot replacement candidate of the one or more utterance training samples includes: measuring an enumerability attribute for the slot replacement candidate within the corpus; evaluating the enumerability attribute of the slot replacement candidate against an enumeration threshold; if the enumerability attribute of the slot replacement candidate does not exceed the enumeration threshold, categorizing the given slot candidate as a distinct unsafe slot.

In one embodiment, deriving the one or more distinct skeleton utterances for the slot replacement candidate includes: creating a skeleton set for containing each of a plurality of distinct potential skeleton utterances for the slot replacement candidate; converting each of a plurality of utterance-based training data samples from the corpus to the plurality of distinct potential skeleton utterances, wherein converting each of the plurality of utterance-based training data samples includes: replacing one or more tokens at a position of the slot replacement candidate with a special token indicating a focus of a potential skeleton utterance; and if one or more other slots exist within each of the plurality of utterance-based training data samples, replacing one or more tokens at one or more positions of the one or more other slots with one or more proper slot classification labels; if a duplicate skeleton utterance does not exist in the skeleton set, adding each of the plurality of utterance-based training data samples, as converted, as one of the plurality of distinct potential skeleton utterances.

In one embodiment, if a difference between a first potential skeleton utterance of the plurality of distinct potential skeleton utterances and a second potential skeleton utterance of the plurality of distinct potential skeleton utterances within the skeleton set is only by an one-edit substitution with a slot classification label, designating both the first and the second potential skeleton utterances as unsafe for modification of the slot replacement candidate with the randomly-generated slot token value.

In one embodiment, the method includes extracting from the skeleton set a subset of the plurality of distinct potential skeleton utterances that are designated as safe for modification of the slot replacement candidate with the randomly-generated slot token value, wherein the subset comprises the one or more skeleton utterances.

In one embodiment, the method includes training one or more machine learning models using the artificially diverse corpus of training data samples.

In one embodiment, converting each of the one or more skeleton utterances of the subset back to one or more distinct utterance training data samples includes: retrieving original slot token values for each slot of the one or more skeleton utterances having the one or more proper slot classification labels; and
replacing the one or more proper slot classification labels with one of the original slot token values.

In one embodiment, if a target slot of an original utterance corresponding to the slot replacement candidate included multiple tokens, the altering includes replacing the special token of a given skeleton utterance with multiple distinct randomly-generated token values matching a number of the multiple tokens.

In one embodiment, constructing the artificially diverse corpus of training data samples for training the contextually-biased model includes: artificially expanding the artificially diverse corpus by augmenting the corpus of utterance-based training data samples with the percentage of the one or more distinct utterance training samples.

In one embodiment, constructing the artificially diverse corpus of training data samples for training the contextually-biased model includes: artificially diversifying the artificially diverse corpus by replacing original utterance-based training samples of the corpus of utterance-based training data samples with the percentage of the one or more distinct utterance training samples.

In one embodiment, the randomly-generated token value comprises one or more nonsensical terms or set of characters that do not confer any real-world or computer-based meaning within the one or more distinct utterance training samples.

In one embodiment, a system for constructing an artificially diverse corpus of training data samples for training a contextually-biased model for a machine learning-based dialogue system, the system comprising: a machine learning-based automated dialogue service implemented by one or more hardware computing servers that: evaluate a corpus of utterance-based training data samples, wherein the evaluating includes: identifying a slot replacement candidate relating to a slot existing in one or more utterance training samples of the corpus that is suitable for replacement with a randomly-generated slot token value; derive one or more distinct skeleton utterances that include the slot replacement candidate based on an input of a plurality of distinct utterance training samples from the corpus, wherein deriving the one or more distinct skeleton utterances includes replacing one or more slots of each of the plurality of distinct utterance training samples with one of a special token and one or more proper slot classification labels; select a subset of the one or more distinct skeleton utterances; convert each of the one or more distinct skeleton utterances of the subset back to one or more distinct utterance training samples while still maintaining the special token at a position of the slot replacement candidate; alter a percentage of the one or more distinct utterance training samples by supplanting the special token with a distinct randomly-generated slot token value at the position of the slot replacement candidate; and construct the artificially diverse corpus of training data samples for training the contextually-biased model based on a collection of the percentage of the one or more distinct utterance training samples.

In one embodiment, identifying the slot replacement candidate includes: categorizing the slot replacement candidate of the one or more utterance training samples of the corpus as one of a safe slot and an unsafe slot, wherein the safe slot relates to a target slot that is suitable for replacement with the randomly-generated token value, and wherein the unsafe slot relates to a distinct target slot that is not suitable for replacement with a distinct randomly-generated token value.

In one embodiment, deriving the one or more distinct skeleton utterances for the slot replacement candidate includes: creating a skeleton set for containing each of a plurality of distinct potential skeleton utterances for the slot replacement candidate; converting each of a plurality of utterance-based training data samples from the corpus to the plurality of distinct potential skeleton utterances, wherein converting each of the plurality of utterance-based training data samples includes: replacing one or more tokens at a position of the slot replacement candidate with a special token indicating a focus of a potential skeleton utterance; and if one or more other slots exist within each of the plurality of utterance-based training data samples, replacing one or more tokens at one or more positions of the one or more other slots with one or more proper slot classification labels; if a duplicate skeleton utterance does not exist in the skeleton set, adding each of the plurality of utterance-based training data samples, as converted, as one of the plurality of distinct potential skeleton utterances.

BRIEF DESCRIPTION OF THE FIGURES

FIG. 2 illustrates an example method in accordance with one or more embodiments of the present application.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. System for a Machine Learning-Based Dialogue System

Figure 1:
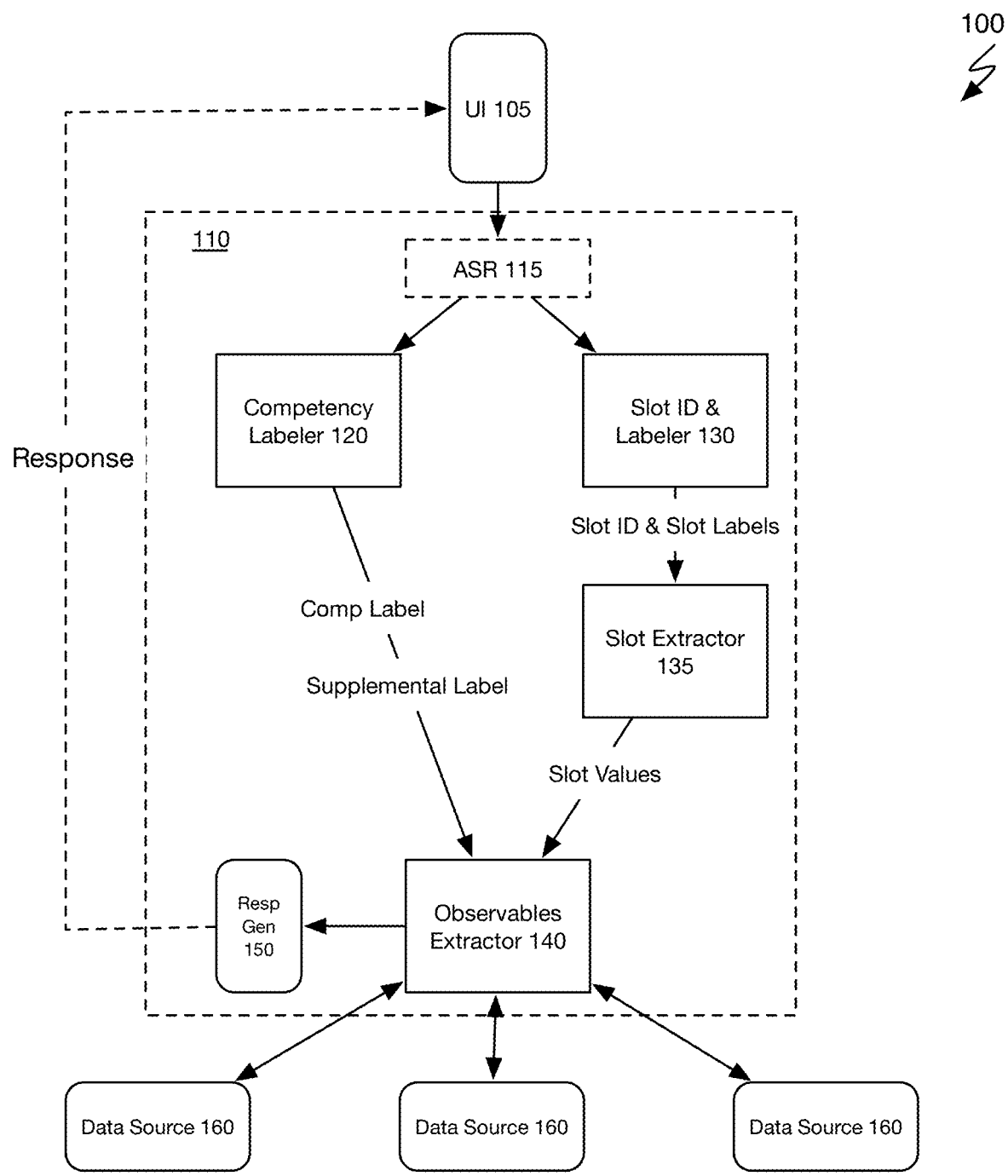
FIG. 1 illustrates a schematic representation of a system 100 in accordance with one or more embodiments of the present application.
Figure 1A:
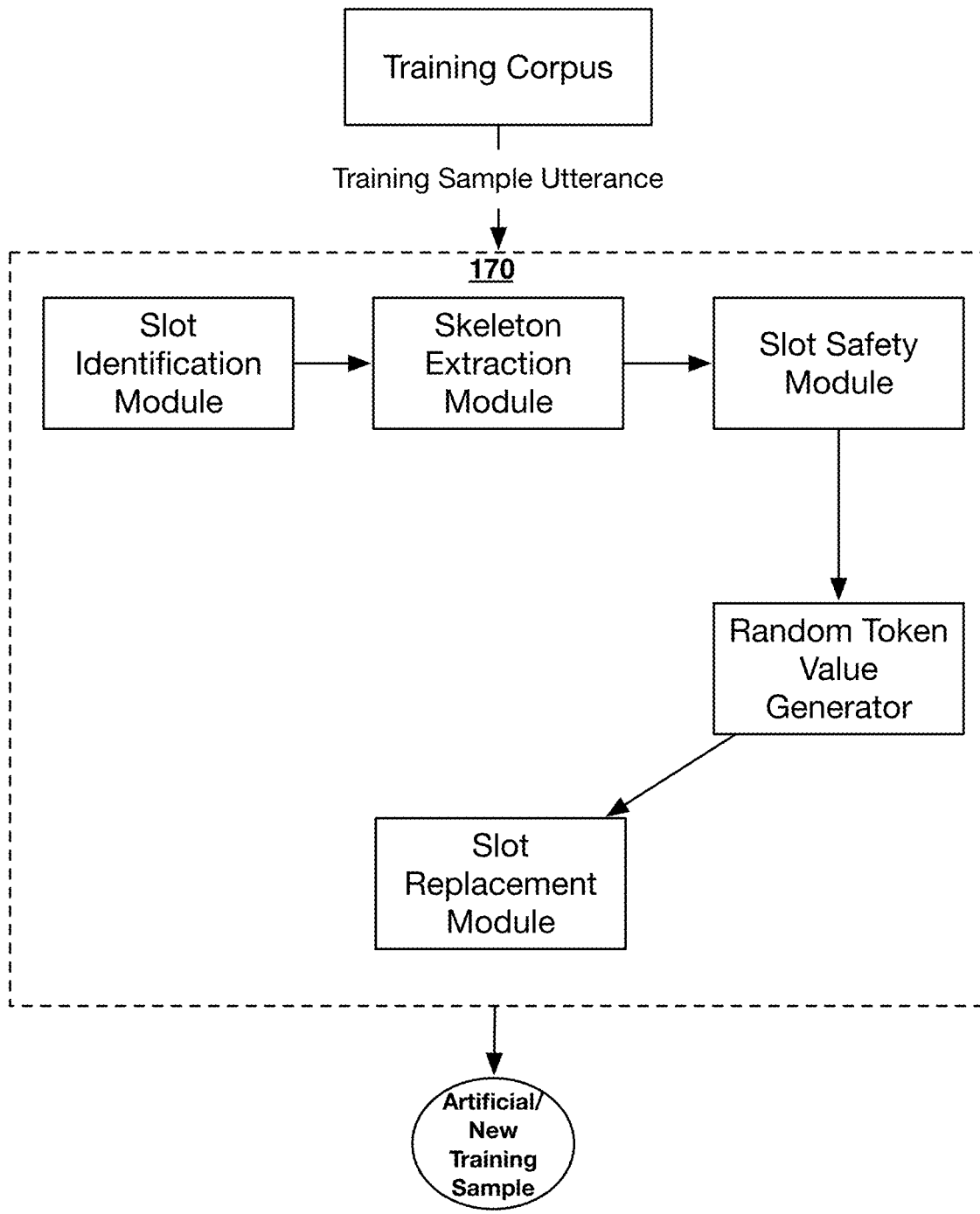
FIG. 1A illustrates a schematic representation of a sub-system 170 of system 100 in accordance with one or more embodiments of the present application.

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. Additionally, the system 100 may include artificial training corpus diversity sub-system 170 that may function to generate an artificially diverse training corpus based on training samples from an existing training corpus.

Generally, the system 100 functions to implement the artificial intelligence virtual assistant platform 110 to enable intelligent and conversational responses by an artificially intelligent virtual assistant to a user query and/or user command input into the system 100, as described in U.S. patent application Ser. No. 15/797,414 and U.S. patent application Ser. No. 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform 110 may be implemented via one or more specifically configured web or private computing servers (or a distributed computing system; e.g., the cloud) or any suitable system for implementing the system 100 and/or the method 200.

In some implementations, the artificial intelligence virtual assistant platform no may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform no. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform no. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were misspredicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the machine learning-based virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to consider the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Generating an Artificially Diverse Training Corpus & Training a Contextually-Biased Slot-Filling Model Using the Training Corpus As shown in FIG. 2, a method 200 for intelligently sourcing and curating training data for one or more machine learning models of a dialogue system includes identifying one or more slots for replacement S210, identifying and extracting skeleton utterances S220, and altering one or more safe slots of a training sample utterance S230. The method 200 optionally includes training a contextually-biased model using the artificially diverse training corpus S240.

The method 200 generally enables an effective approach to generating diverse slot-filling training data that, when executed as training samples, enables machine learning-based models to generalize well to out-of-vocabulary tokens on non-contextual embeddings of an utterance. A technical problem with slot-filling techniques include their inability to generalize for tokens not seen during training (i.e., out-of-vocabulary tokens). This technical problem is exacerbated for slots that have an unbounded number of possible values (i.e., open-vocabulary slots).

Accordingly, the method 200 provides a novel data augmentation technique that encourages and/or biases a learning of a model, during a training phase, of context to predict slot labels for token values that may have been unseen during the training phase of the model. In one embodiment, the method 200 enables a modification of a training corpus in lieu of (or possibly in addition to) modifying an underlying slot-labeling model's architecture. At least one technical advantage of such technique(s) described in the method 200 includes providing a consistent resolution to the technical challenge of predicting accurate slot labels for unseen slot values while incurring a fraction of the computing resource costs for sourcing training data and training contextual embeddings models.

2.1 Candidate Slot Identification & Selection

S210, which includes identifying one or more slots for replacement, may function to assess (substitution factor) (attributes of the slot) a suitability of one or more slots or tokens of a training sample (e.g., a training sample utterance) for substitution with an artificially-generated random token value. In one or more embodiments, a selected slot from an utterance-based training data sample may be referenced as a slot (replacement) candidate indicating that a token value found within the slot replacement candidate may be suitable for replacement with an artificially-generated random token value. In one or more embodiments, the artificially-generated random token value preferably includes or relates to a token without a recognized or interpretable value. In such embodiments, the randomly generated token may include one or more of a completely made up or fabricated term, a combination of characters without a dictionary meaning or a discoverable interpretation/meaning.

In one implementation, S210 may function to filter slots of a candidate training sample into one of at least two slot categories. In such implementation, S210 preferably assesses each candidate slot for replacement of a subject training sample to determine and/or identify the candidate slot as either a safe slot or an unsafe slot. A safe slot as referred to herein preferably relates to a slot that may be a suitable candidate for replacement with a randomly-generated value. An unsafe slot as referred to herein preferably relates to a slot that may not be a suitable candidate for replacement with a random token value.

In one embodiment, S210 may function to assess one or more attributes of a candidate slot of a candidate training sample to identify whether one or more measurable dimensions of the candidate slot render the candidate slot suitable for replacement or not. For instance, S210 may function to measure an average and/or maximum phrase or token length of a given candidate slot. In such instance, if the measured average token length or measured maximum phrase length exceeds a maximum phrase length threshold (i.e., the possible phrases for the candidate slot are too long), then S210 may mark or identify the slot candidate as unsuitable for replacement or as an unsafe slot. Otherwise, S210 may function to mark the candidate slot as a safe slot and/or continue an assessment of the suitability of candidate slot for replacement if the candidate slot does not satisfy or exceed the maximum phrase length threshold. It shall be known that an average token length of a given candidate slot may be measured based on a sampling of a plurality of distinct training data samples from a common corpus of training samples, measuring a token length of the candidate slot in each of the plurality of distinct training data samples, aggregating the measured token lengths and computing the average token length by diving the aggregated token lengths by the number of measured slots.

Additionally, or alternatively, S210 may function to assess an enumerability attribute or metric of a candidate slot of the candidate training sample to determine whether the candidate slot may be safe or unsafe for replacement. In one embodiment, S210 may function to identify whether a candidate slot may be exhaustively enumerated (e.g., months, state names, etc.). In such embodiment, S210 may function to assess whether the possible enumerations of a given candidate slot exceeds a maximum enumeration threshold or can be achieved with a recognized or known number of enumerated token values. That is, in the case of a candidate slot within an utterance that is intended or may contain a token value for a given month in the year, S210 may function to evaluate the candidate slot and identify that a maximum enumeration of the slot may be twelve (12) distinct slot tokens since there is a maximum of 12 months in one year. In the circumstance that the enumerability of the candidate slot does not exceeds the minimum enumeration threshold, S210 may function to identify the candidate slot as an unsafe slot thereby excluding the candidate slot from further consideration for replacement. Otherwise, if an enumerability of the candidate slot satisfies or exceeds the minimum enumeration threshold, S210 may function to identify the candidate slot as safe.

It shall be noted that the assessment of the measurable dimensions and/or of the enumerability of a given candidate slot for replacement may be a subset of example replacement factors used in S210 to identify a candidate slot as safe or unsafe for replacement and therefore, should not be limited to the above-described replacement factors when determining a suitability of a slot for replacement.

2.2 Skeleton Utterance Extraction & Skeleton Set Generation

S220, which includes identifying and extracting skeleton utterances, may function to derive a skeleton utterance for each candidate slot (i) to capture a context encapsulating the candidate slot in an example utterance. Accordingly, a skeleton utterance as referred to herein preferably relate to utterances that capture a context of a given slot that may be safe for replacement or substitution with a randomly-generated value. Additionally, or alternatively, a skeleton utterance may sometimes be referred to herein as a slot skeleton.

For a given candidate slot, S220 may function to generate or create an empty skeleton set (Si) that may include a plurality of skeleton utterances for a given candidate slot. S220 may function to iterate over the plurality of skeleton utterances within the skeleton set to identify which skeleton utterances may be generalized and to identify which slots may be marked as safe for replacement.

In one embodiment, generating the skeleton set preferably includes labeling (i.e., BIO-labeling) a skeleton utterance with only the B- and O-labeled tokens within the utterance and with candidate slots' tokens replaced with a special or distinct token, such as "CURR_SLOT" with all other slots' tokens being replaced with their respective slot classification labels. Accordingly, BIO-labeling is an example token labeling technique in which contextual tokens surrounding one or more candidate slots are labeled with either a "B" or an "O" and the one or more tokens at the candidate slot of a sample training utterance replaced with a proper or corresponding slot classification label. It shall be noted that the contextual token markers can be any suitable character and marking and should not be limited to the characters "B" and/or "O". In such embodiment, if the skeleton utterance (s), as modified, may not already be present in the skeleton set (Si), then S220 may function to add the skeleton utterance to the skeleton set and mark the candidate slot (e.g., CURR_SLOT) as safe to replace. However, if the skeleton set includes a skeleton utterance (s') that differences from the candidate skeleton utterance by one-edit substitution of a slot label other than the candidate slot (i), then S220 may function to mark both the candidate skeleton slot and the skeleton slot within the skeleton set as unsafe to replace. Accordingly, at the end of an iteration process through the skeleton set, S220 may function to remove all skeleton utterances from the skeleton set that were marked unsafe. As a result, the balance of the skeleton utterances within the skeleton set should include skeleton utterances with a candidate slot that is safe to replace with a new token value, such as a randomly-generated value.

Figure 3:
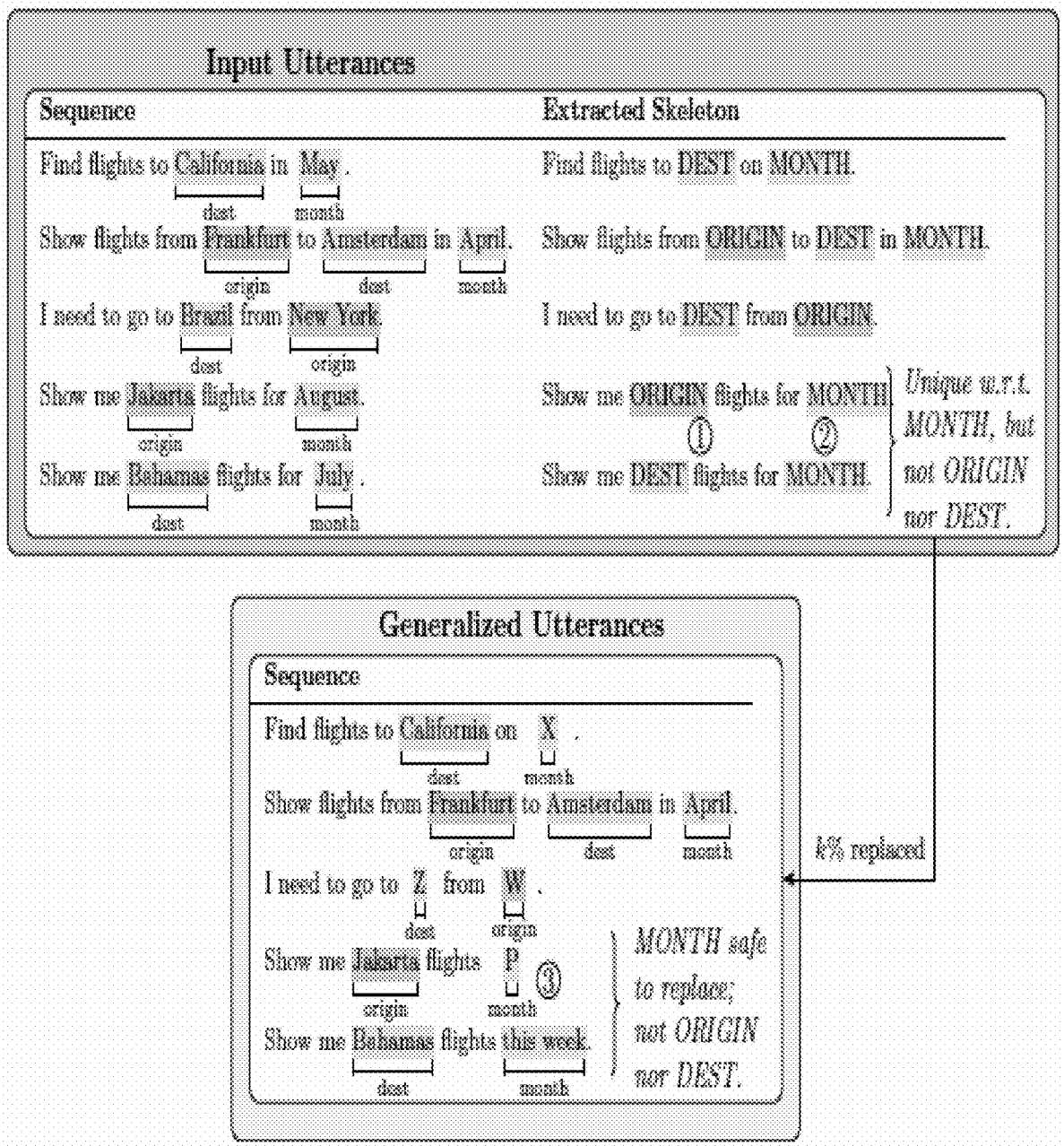
FIG. 3 illustrates an example schematic for implementing portions of a method and a system in accordance with one or more embodiments of the present application.

As shown by way of example in FIG. 3, S220 may initialize a skeleton utterance discovery and/or skeleton set generation based on an input of an utterance dataset in which each utterance of the utterance dataset has been labeled with slots (e.g., the origin of a desired flight and the like). For each utterance of the utterance dataset, S220 may function to extract a skeleton utterance that captures a context in which each candidate slot appears. For each candidate slot in which the candidate slot uniquely appears in each skeleton utterance, S230 may function to select a percentage (k %) of the candidate slots whose slot values may be replaced with random alphanumeric characters. In one or more embodiments, the selected percentage may be a predetermined percentage value set in advance of the selection of the candidate slots and may be based on a size of a set or corpus comprising the skeleton utterances. Additionally, or alternatively, the selected percentage may be a randomly generated percentage value.

For instance, as shown in annotation 1, two distinct utterances can be extracted to a same skeleton utterance; however, neither of the slot labels including ORIGIN nor DEST are unique slot mappings (i.e., only the token value in that slot can distinguish between those slot labels). By contrast, in annotation 2, the slot label MONTH may be unique to that slot (i.e., only that slot occupies that slot location in all sentences with that structure. Accordingly, as described in more detail below in S230, the random replacement of a candidate slot with a unique slot mapping or unique skeleton utterance structure may be performed independently for each slot and yield new generalized utterances that may be used for subsequent training. Thus, continuing with the example, in annotation 3, because the MONTH candidate slot may be unique to the "Show me ORIGIN/ DEST flights for MONTH" skeleton, S220 may function to identify include such skeleton utterance within the skeleton set and further, identify the candidate slot (MONTH) as eligible for replacement.

2.3 Candidate Slot Replacement with Random Value

S230, which includes altering one or more safe slots of a training sample utterance, may function to modify a suitable skeleton utterance having safe slots with their labels by randomly substituting into each candidate slot of the skeleton utterance randomly-generated token values to generate new training utterances. As mentioned previously, the randomly-generated token values preferably include randomly-generated alphanumeric values, however, it shall be noted that any random value and/or combination of characters may be used as a random slot substitute. In some embodiments, the randomly-generated token value is a nonsensical term or set of characters that do not confer any real-world or computer-based meaning within a training sample.

In a preferred embodiment, S230 may function to replace a set number of or a predetermined percentage (i.e., k %) of safe slots to generate a new training sample. In such preferred embodiment, a skeleton utterance having safe slot values may be extracted and converted back from a skeleton to a training utterance by retrieving the original slot token values of the training utterance (e.g., the original training sample sentence with all original token values as seen in the original training corpus) and placing the original slot token values back into their respective slots.

Additionally, or alternatively, S230 may function to select k % of the safe slots of the original training utterance and replace each training utterance's slot value that may be a safe slot (i) with a randomly-generated alphanumeric string and/or any suitable randomly-generated string value.

In some embodiments, if an original training utterance included a slot value having multiple tokens, then S230 may function to randomly generate a string value also having a matching number of tokens (e.g., "New York" may be replaced with "2k3 Th69[p" or the like).

In one variation, S230 may function to replace safe slot tokens of a given training sample utterance with slot token values from a predetermined list of token values. In such variation, S230 may function randomly sample the list or corpus of token values and replace the slot values of the training sample utterance with the randomly sampled token values to generate a new training sample.

S230 may additionally, or alternatively function to embed each of the randomly-generated string values in each slot of a new training utterance to a single UNK vector. In a first implementation, S230 may function to replace an original training utterance within the training corpus with the substitute/new training utterance sample thereby artificially diversifying the training corpus. In a second implementation, S230 may function to augment the training corpus with the new training utterance such that both the original training utterance and the new training utterance are included within the training corpus thereby artificially expanding the training corpus and artificially diversifying the training corpus.

Optionally, S240, which includes training a contextually-biased model, may function to train a selected classifier model using the artificially diversified training corpus. S240 may function to train any suitably selected model using a combination of crowdsourced training samples and/or artificially diverse training sample utterances from the training corpus. Accordingly, a resulting trained classifier model may function to accurately predict slot classification labels for slots of a given production or real-word user utterance contain slot token values that may not have been seen by the trained classifier model during a training phase.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of constructing an artificially diverse corpus of training data samples for training a contextually-biased model for a machine learning-based dialogue system, the method comprising:
evaluating a corpus of utterance-based training data samples, wherein the evaluating includes:
identifying a slot replacement candidate relating to a slot existing in one or more utterance training samples of the corpus that is suitable for replacement with a randomly-generated slot token value;
deriving one or more distinct skeleton utterances that include the slot replacement candidate based on an input of a plurality of distinct utterance training samples from the corpus, wherein deriving the one or more distinct skeleton utterances includes replacing one or more slots of each of the plurality of distinct utterance training samples with one of a special token and one or more proper slot classification labels;
selecting a subset of the one or more distinct skeleton utterances;
converting each of the one or more distinct skeleton utterances of the subset back to one or more distinct utterance training samples while still maintaining the special token at a position of the slot replacement candidate;
altering a percentage of the one or more distinct utterance training samples by supplanting the special token with a distinct randomly-generated slot token value at the position of the slot replacement candidate;
constructing the artificially diverse corpus of training data samples for training the contextually-biased model based on a collection of the percentage of the one or more distinct utterance training samples;
training one or more machine learning models using the artificially diverse corpus of training data samples;
implementing the one or more machine learning models to predict a classification of one or more slots of an utterance input to the machine learning-based dialogue system; and
generating a response by the machine learning-based dialogue system based on the classification of the one or more slots of the utterance input.

2. The method according to claim 1, wherein identifying the slot replacement candidate includes:
selecting a slot of the one or more utterance training samples of the corpus as the slot replacement candidate if an enumerability of the slot to different token values satisfies or exceeds an enumeration threshold, wherein the enumeration threshold comprises a minimum number of possible token values for the given slot.

3. The method according to claim 1, wherein identifying the slot replacement candidate includes:
categorizing the slot replacement candidate of the one or more utterance training samples of the corpus as one of a safe slot and an unsafe slot, wherein the safe slot relates to a target slot that is suitable for replacement with the randomly-generated token value, and wherein the unsafe slot relates to a distinct target slot that is not suitable for replacement with a distinct randomly-generated token value.

4. The method according to claim 3, wherein categorizing the slot replacement candidate of the one or more utterance training samples includes:
measuring an average token length for the slot replacement candidate within the corpus;
evaluating the average token length of the slot replacement candidate against a token length threshold;
if the average token length of the slot replacement candidate satisfies or exceeds the token length threshold, categorizing the slot replacement as a distinct unsafe slot.

5. The method according to claim 3, wherein categorizing the slot replacement candidate of the one or more utterance training samples includes:
measuring an average token length for the slot replacement candidate within the corpus;
evaluating the average token length of the slot replacement candidate against a token length threshold;
if the average token length of the slot replacement candidate does not exceed the token length threshold, categorizing the slot replacement as a distinct safe slot.

6. The method according to claim 3, wherein categorizing the slot replacement candidate of the one or more utterance training samples includes:
measuring an enumerability attribute for the slot replacement candidate within the corpus;
evaluating the enumerability attribute of the slot replacement candidate against an enumeration threshold;
if the enumerability attribute of the slot replacement candidate satisfies or exceeds the enumeration threshold, categorizing the given slot candidate as a distinct safe slot.

7. The method according to claim 3, wherein categorizing the slot replacement candidate of the one or more utterance training samples includes:
measuring an enumerability attribute for the slot replacement candidate within the corpus;
evaluating the enumerability attribute of the slot replacement candidate against an enumeration threshold;
if the enumerability attribute of the slot replacement candidate does not exceed the enumeration threshold, categorizing the given slot candidate as a distinct unsafe slot.

8. The method according to claim 1, wherein deriving the one or more distinct skeleton utterances for the slot replacement candidate includes:
creating a skeleton set for containing each of a plurality of distinct potential skeleton utterances for the slot replacement candidate;
converting each of a plurality of utterance-based training data samples from the corpus to the plurality of distinct potential skeleton utterances, wherein converting each of the plurality of utterance-based training data samples includes:
replacing one or more tokens at a position of the slot replacement candidate with a special token indicating a focus of a potential skeleton utterance; and
if one or more other slots exist within each of the plurality of utterance-based training data samples, replacing one or more tokens at one or more positions of the one or more other slots with one or more proper slot classification labels;
if a duplicate skeleton utterance does not exist in the skeleton set, adding each of the plurality of utterance-based training data samples, as converted, as one of the plurality of distinct potential skeleton utterances.

9. The method according to claim 8, wherein
if a difference between a first potential skeleton utterance of the plurality of distinct potential skeleton utterances and a second potential skeleton utterance of the plurality of distinct potential skeleton utterances within the skeleton set is only by an one-edit substitution with a slot classification label, designating both the first and the second potential skeleton utterances as unsafe for modification of the slot replacement candidate with the randomly-generated slot token value.

10. The method according to claim 8, further comprising:
extracting from the skeleton set a subset of the plurality of distinct potential skeleton utterances that are designated as safe for modification of the slot replacement candidate with the randomly-generated slot token value, wherein the subset comprises the one or more skeleton utterances.

11. The method according to claim 1, wherein
converting each of the one or more skeleton utterances of the subset back to one or more distinct utterance training data samples includes:
retrieving original slot token values for each slot of the one or more skeleton utterances having the one or more proper slot classification labels; and
replacing the one or more proper slot classification labels with one of the original slot token values.

12. The method according to claim 1, wherein
if a target slot of an original utterance corresponding to the slot replacement candidate included multiple tokens, the altering includes replacing the special token of a given skeleton utterance with multiple distinct randomly-generated token values matching a number of the multiple tokens.

13. The method according to claim 1, wherein
constructing the artificially diverse corpus of training data samples for training the contextually-biased model includes:
artificially expanding the artificially diverse corpus by augmenting the corpus of utterance-based training data samples with the percentage of the one or more distinct utterance training samples.

14. The method according to claim 1, wherein
constructing the artificially diverse corpus of training data samples for training the contextually-biased model includes:
artificially diversifying the artificially diverse corpus by replacing original utterance-based training samples of the corpus of utterance-based training data samples with the percentage of the one or more distinct utterance training samples.

15. The method according to claim 1, wherein
the randomly-generated token value comprises one or more nonsensical terms or set of characters that do not confer any real-world or computer-based meaning within the one or more distinct utterance training samples.

16. A system for constructing an artificially diverse corpus of training data samples for training a contextually-biased model for a machine learning-based dialogue system, the system comprising:
a machine learning-based automated dialogue service implemented by one or more hardware computing servers that:
evaluate a corpus of utterance-based training data samples, wherein the evaluating includes:
identifying a slot replacement candidate relating to a slot existing in one or more utterance training samples of the corpus that is suitable for replacement with a randomly-generated slot token value;
derive one or more distinct skeleton utterances that include the slot replacement candidate based on an input of a plurality of distinct utterance training samples from the corpus, wherein deriving the one or more distinct skeleton utterances includes replacing one or more slots of each of the plurality of distinct utterance training samples with one of a special token and one or more proper slot classification labels;
select a subset of the one or more distinct skeleton utterances;
convert each of the one or more distinct skeleton utterances of the subset back to one or more distinct utterance training samples while still maintaining the special token at a position of the slot replacement candidate;
alter a percentage of the one or more distinct utterance training samples by supplanting the special token with a distinct randomly-generated slot token value at the position of the slot replacement candidate;
construct the artificially diverse corpus of training data samples for training the contextually-biased model based on a collection of the percentage of the one or more distinct utterance training samples;
train one or more machine learning models using the artificially diverse corpus of training data samples;
implement the one or more machine learning models to predict a classification of one or more slots of an utterance input to the machine learning-based dialogue system; and
generate a response by the machine learning-based dialogue system based on the classification of the one or more slots of the utterance input.

17. The system according to claim 16, wherein
identifying the slot replacement candidate includes:
categorizing the slot replacement candidate of the one or more utterance training samples of the corpus as one of a safe slot and an unsafe slot, wherein the safe slot relates to a target slot that is suitable for replacement with the randomly-generated token value, and wherein the unsafe slot relates to a distinct target slot that is not suitable for replacement with a distinct randomly-generated token value.

18. The system according to claim 16, wherein
deriving the one or more distinct skeleton utterances for the slot replacement candidate includes:
creating a skeleton set for containing each of a plurality of distinct potential skeleton utterances for the slot replacement candidate;
converting each of a plurality of utterance-based training data samples from the corpus to the plurality of distinct potential skeleton utterances, wherein converting each of the plurality of utterance-based training data samples includes:
replacing one or more tokens at a position of the slot replacement candidate with a special token indicating a focus of a potential skeleton utterance; and
if one or more other slots exist within each of the plurality of utterance-based training data samples, replacing one or more tokens at one or more positions of the one or more other slots with one or more proper slot classification labels;
if a duplicate skeleton utterance does not exist in the skeleton set, adding each of the plurality of utterance-based training data samples, as converted, as one of the plurality of distinct potential skeleton utterances.

\* \* \* \* \*